Sept. 7, 1954  A. G. BRISACK  2,688,497
SEALING NUT ASSEMBLY
Filed Dec. 17, 1951
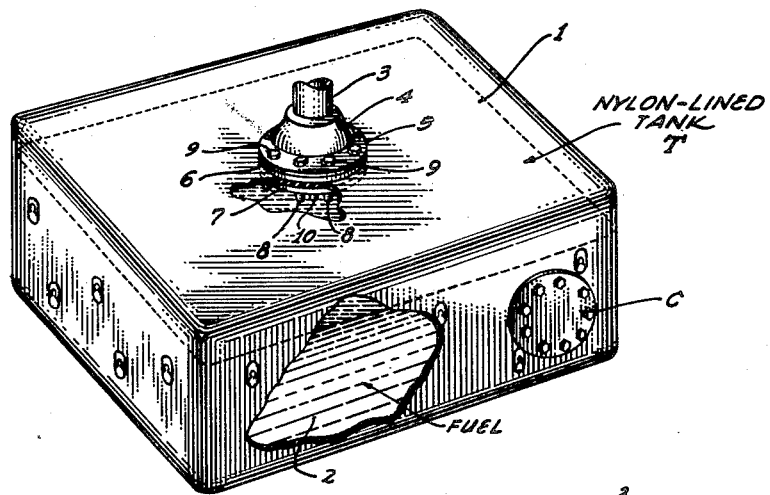
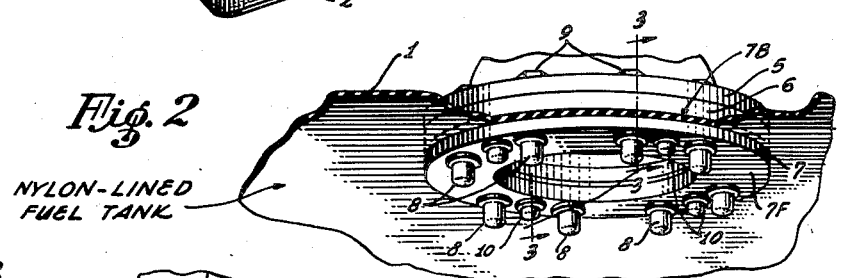
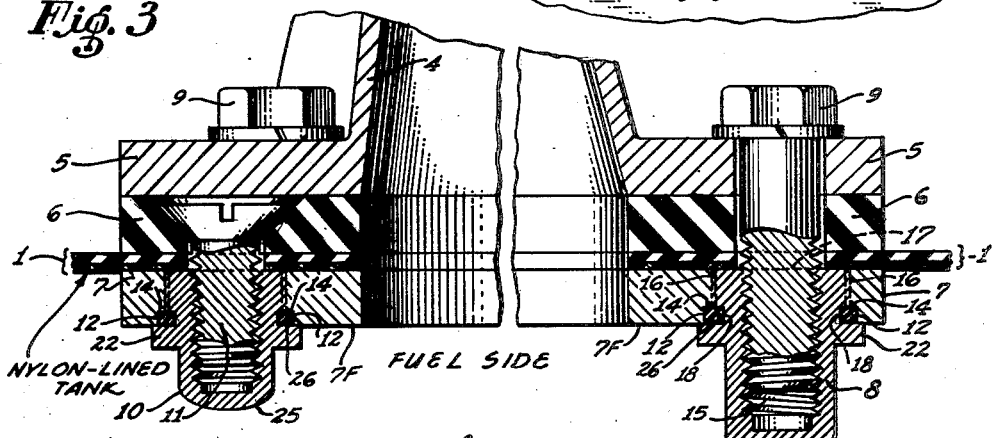
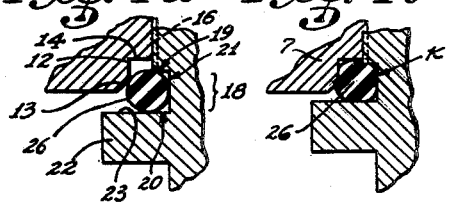
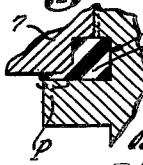
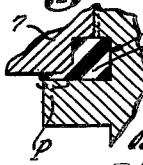
INVENTOR:
ALLEN G. BRISACK
BY Herbert E. Metcalf
HIS PATENT ATTORNEY Patented Sept. 7, 1954

2,688,497

UNITED STATES PATENT OFFICE 2,688,497

SEALING NUT ASSEMBLY

Allen G. Brisack, Torrance, Calif., assignor to Northrop Aircraft, Inc., Hawthorne, Calif., a corporation of California Application December 17, 1951, Serial No. 262,015

3 Claims. (Cl. 285—38)

This invention relates to fittings for use in attaching closure plates to openings in fuel cells and other flexible tanks, and more particularly to improvements in an assembly of the kind in which use is made of rigid washers around the openings, fastening means extending through said washers, and dome nuts mounted on said fastening means.

One of the more important objects of this invention is to provide liquid-tight demountable closure means adapted for use with many types of flexible tanks and fuel cells and having optimal performance characteristics under exacting operational requirements in many diversified applications. Other objects of this invention include providing a sealing nut assembly that will be leakproof under most adverse conditions of pressure and torsional strain, made of metals and materials of known and controllable strength and quality, repairable by average mechanics using simple tools, and possessing an inherent and unique sealing ability of its own that becomes more operative and effective as tension is increased, yet, withal, comparatively inexpensive to manufacture requiring only semi-skilled craftsmen and modest tooling.

In brief, my invention is actually an assembly consisting of a plurality of special sealing nuts, a machined mounting flange and a matching watertight gasket designed for use as the inner component in fluid-tight leakproof closures of flexible tanks and compression chambers of various kinds. The design of the sealing nuts, of the flange and of the gasket, and the manner in which they mate and cooperate to produce the desired result are all factors in this invention.

The washerlike mounting flange can be of any size or shape having an inner diameter or cut-out area to match that of the tank opening around which it is to be fastened, and is perforated with suitably spaced holes having shallow counterbores of slightly larger diameter, chamfered at the inner face of the flange, and terminated interiorly in square shoulders between and perpendicular to the walls of the two bores.

The sealing nut is substantially cylindrical in outer contour, has a threaded centerbore terminating in a domed closure, a splined shank section at orifice end of threaded bore dimensioned for a press fit with hole in flange, a circumferential groove designed to hold a flexible sealing ring against the face of an adjacent protruding shoulder so that when the sealing nut is pressed into the mounting flange, the sealing ring is squeezed between the shoulder and the flange and is pressed into a square-cornered annular cavity formed by the groove and the shallow counterbore in the face of the flange.

The final component of the sealing nut assembly is a liquid-tight compression gasket, molded of generally solid but resilient, solvent resistant material, and perforated with a plurality of large holes and a lesser number of small holes to align with mounting flange holes and with the sealing nuts impressed therein. The small holes are deeply countersunk to receive the flat heads of comparatively short positioning bolts used to fasten the compression gasket on outside of tank to the sealing nut mounting flange on inside of tank, and hold the sealing assembly in position around the tank opening when the large cover-plate bolts have been removed. When positioning bolts have been installed and tightened, the sealing nut assembly is complete and ready for use with any type of cover-plate, pipe or instrument attachment fitting that may be required for the particular installation.

When a cover-plate is installed on outside of tank and cover-plate bolts are tightened, the cold-flowing substance of the sealing ring in each sealing nut completely fills the interior annular cavity between the flange counterbore and the groove and shoulder of the sealing nut, and is finally extruded into and through the chamfer at the face of the flange, creating a liquid-tight seal which becomes tighter as tension is increased, and is maintained under most unfavorable conditions of torque, tension, vibration and internal pressure. Tank closure assemblies embodying the concepts of my invention essentially as described are now being used with excellent results on certain military aircraft.

Many advantages of this novel and improved sealing nut assembly, in addition to those which are immediately self-evident, will be pointed out or become apparent in the following description of the drawings in which one embodiment of the invention is illustrated, but it is to be understood that the presentation of this single form and application shall not be accorded any interpretation which might tend to limit the utilization of all that I claim as my invention to less than its true and most comprehensive scope in the art.

Reference is made to the accompanying drawings, each of which is a progressive enlargement of a portion of the former, illustrating—as previously mentioned—just one preferred mechanical embodiment of the invention.

In the drawings:

Figure 1 is a perspective view of a typical fuel cell with sections cut away to show relative positioning of sealing assembly components on top and one side of tank.

Figure 2 is a perspective view of the sealing assembly shown on top of tank in Figure 1 as it would appear when viewed obliquely from inside of tank.

Figure 3 is a sectional view through points 3—3 as indicated in Figure 2, showing the large and small bolts and sealing nuts together with the other components of the closure assembly.

Figures 4a, 4b, and 4c are diagrammatic sectional views of the annular cavity between a sealing nut and a counterbore in mounting flange, and show progressively the manner in which the sealing ring is deformed within the cavity and its cold-flowing substance extruded into chamfer at face of flange when cover-plate bolts are tightened.

As shown in the drawings:

Figure 1 shows the exterior surface of a typical flexible fuel cell, such as a tank T containing liquid 2, which enters fuel cell through pipe 3 attached to top of tank by means of a pipe coupling fitting 4, and a cover-plate 5 in Figures 1, 2 and 3. The cover-plate, which may incorporate connections for fuel supply lines, liquid measuring devices or other instruments, is secured to the fuel cell by means of the sealing nut assembly which is the subject of this invention. The assembly includes an outer-compression gasket 6, a machined mounting flange 7 and a plurality of large sealing nuts 8 for cover-plate bolts 9 and small nuts 10 for positioning bolts 11. This assembly, when used with a suitable cover-plate, provides liquid-tight sealing means for the flexible cell and remains attached to the tank when the cover-plate is removed, thus serving additionally as a reinforcing frame for the fuel cell opening.

Another common type of fuel cell opening also requiring leakproof closure means is shown on front of tank in Figure 1. It is an inspection or access hole covered with a flat circular coverplate C secured with a plurality of attaching bolts to a sealing nut assembly, such as that described herein.

Since the size and shape of a fuel cell opening must be governed entirely by its purpose, it is impossible to standardize upon a single assembly sized and shaped to fit every installation. Consequently, one of the purposes of my invention is to provide closure means amenable to changes in size and construction and adapted to a variety of needs. Therefore, it is not intended to limit the use of my invention to the single form in which it is hereinafter more completely described.

As used in one particular application as a closure of a fuel cell installed in certain military aircraft, my invention includes a flat, circular, machine-finished flange 7 in Figure 2, having a smooth face 7F and parallel back face 7B perpendicular to the axial centerline, its inner diameter being determined by the size of the opening to be enclosed, and its outer diameter and peripheral thickness in keeping with the stress requirements imposed by the particular application. The body of the flange is perforated with a plurality of large holes, planned to receive the cover-plate bolts 9, spaced equi-distantly about the circumference of a circle midway between the inner and outer circumferences of the flange, and a lesser number of small holes located with uniform intermittency between said large holes and planned to receive shorter bolts 11 in Figures 1 and 3, having their heads counter-sunk in compression gasket 6, as best seen in Figure 3. The shorter bolts, 11, serve to position the flange on the inner surface of the tank in proper relation to opening therein.

The large and small holes in the flange 7 are enlarged on the face side 7F of the flange by shallow counterbores, 12 in Figure 3, slightly larger in diameter than the holes, said second bores 12 having chamfers 13 in Figure 4a about their orifices at the face 7F of the flange 7 and have flat inner terminations 14 parallel to the face of the flange and perpendicular to and adjacent the generatrix of the second bore. The inner flange 7 and its special bores are, of course, designed to hold in position and provide support for a plurality of elongated self-sealing dome nuts 8 and 10 which comprise another important part of this invention.

Although referred to as a nut since its chief purpose is that of fastening a bolt, this particular sealing nut is actually a combination dome nut, threaded bushing, splined positioning stud and liquid sealing plug.

As shown in right hand section of Figure 3, the sealing nut 8 is generally cylindrical in outer conformation and includes a main body portion having an interiorly threaded center bore 15, an exteriorly splined shank section 16, extending from open end 17 of nut body 8 toward center thereof and terminating in a shallow circumferential groove 18.

The particular positioning and conformation of this groove 18 shown enlarged in Figure 4a should be especially noted since, as will be seen, it plays a most significant part in the successful operation of the subject invention.

Cut inwardly from the outer circumference of the dome nut body 8, the groove 18 is generally rectangular in sectional area, having parallel sides 19 and 20 perpendicular to centerline of nut body and a straight inner termination 21 parallel to centerline of nut body and creating square-cut right-angled inner corners. The groove 18 is cut more deeply into the nut body 8 than the longitudinal grooves between the splines of the shank section 16.

The innermost sidewall 20 of the groove 18—the one spaced farthest from the shank section 16—aligns and unites with the flat face 23 in Figure 4a of a circular shoulder 22 extending radially from outer periphery of dome nut body 8 and perpendicular thereto thus forming a solid "stop" and determining the operative length of splined shank section 16 of nut body, and separating it from smooth-surfaced cylindrical wall of interiorly threaded dome nut section terminating in domed closure 25 at end of nut body opposite orifice 17 of internal bore.

Assembly and installation of the parts is quite simple. A sealing ring, 26 in Figure 4a, circular both in form and in sectional area and molded of suitable liquid-tight, resilient material, is snapped into groove 18 of sealing nut body 8, and is held therein and against face 23 of extending shoulder 22 by its own compressive tension.

Since the depth of the groove 18 is slightly less than the sectional radius of the sealing ring, more than half of the body material of the ring extends outward circumferentially beyond the splines of shank section 16 yet within the outer circumference of adjacent shoulder 22.

With sealing rings 26 installed as described, the splined shank sections 16 of the nut bodies 8 are pressed from face side 7F of flange 7 into holes in the flange, thereby squeezing the body material of the sealing ring into the square corners of the generally square inner annular cavity, formed by the groove 18 and the counterbore. The relative dimensioning of shank sections 16 and holes in flange 7 are such that the splines cut deeply into the inner surfaces of the holes, thereby preventing the nut bodies from turning in the holes or being pushed out when through bolts are being inserted from other side.

When sealing nuts have been installed in all of the flange holes and tank wall has been perforated around opening with holes aligning with those in the sealing nut flange, a suitable liquid-tight adhesive is applied to contacting surfaces of tank wall 1, and flange 7 and gasket 6, small bolts 11 are entered through holes in compression gasket 6, then passed through aligning holes in tank wall 1 into small positioning nuts 10 in flange 7 on inside of tanks. Upon tightening of the positioning bolts 11 the assembly becomes, in effect, an integral part of the fuel cell and is never removed therefrom except for replacement or repair.

The cover-plate, such as 5 or C in Figure 1, is attached with a plurality of large, suitably headed bolts 9 extending through the gasket and tank wall into large sealing nuts 8. Upon tightening of both large and small bolts the sealing nuts are drawn more tightly against face 7F of flanges 7 forcing the cold-flowing material of the sealing ring 26 in Figure 4a into the corners of annular cavity K in Figure 4b, then into the interstices between the shank splines and inner surfaces of holes in flange, and finally extruding a predetermined volume P of body material as in Figure 4c that cannot be enclosed in the cavity K into and through the chambers 22 at the face of the flange 7. In this manner the components of the assembly cooperate to provide a liquid-tight closure which becomes even more secure as tension is increased, yet each component is an independent part and may be removed, repaired and replaced without damage to other parts or to the tank itself.

It is understood that the materials used and details of construction may be varied without departing from the principles of this invention and it is, therefore, not intended to limit the patent granted hereon otherwise than necessitated by the scope of the appended claims.

What is claimed is:

1. A leak-proof fitting for fastening a part in sealed relation to an opening in a flexible wall of a container, comprising: a flange-like rigid member and a sealing gasket for surrounding the wall opening and for clamping therebetween the marginal edge portions of the wall encompassing the opening with said member disposed on the inner side of the wall and exposed to the container interior; said member and gasket having a plurality of aligned holes therein alignable with corresponding holes in the marginal edge portions; dome nuts pressed into said holes in said member from the inner side thereof for removal from said side, said nuts having shoulders thereon engageable with said member to limit movement thereinto; means for sealing said nuts in said member holes; screws extending through certain of said gasket holes into engagement with corresponding of said nuts, said screws having heads countersunk into the outer side of said gasket; and cap screws extending through other of said gasket holes into engagement with corresponding other of said dome nuts for securing a part in sealed relation to the opening by clamping said gasket and the marginal edge portions between the part and said member, there being clearance between the ends of said nuts and the corresponding screw heads and between the ends of said other nuts and the part, when said screws and cap screws are tightened, to enable compression of the marginal edge portions and said gasket.

2. The structure defined in claim 1, in which the sealing means includes means defining an annular packing recess at the inner end of each hole in the member, a circumferential packing groove in each nut cooperating with the corresponding recess, the outer side wall of each said groove being aligned with the corresponding shoulder, and a resilient packing ring in each cooperating pair of recesses and grooves.

3. In a container structure, the combination comprising: a flexible exterior container wall having an opening therein; a flange-like rigid member and a sealing gasket surrounding said opening and clamping therebetween the marginal edge portions of said wall encompassing said opening with said member disposed on the inner side of said wall and exposed to the interior of the container, means defining a series of aligned holes in said gasket, marginal edge portions, and member; shouldered dome nuts pressed into said member holes from the inner side thereof for removal from said side; means for sealing said nuts in said member holes; screws extending through certain of said gasket and marginal edge portion holes into engagement with corresponding of said nuts, said screws having heads countersunk into the outer side of said gasket; and cap screws extending through other of said gasket and marginal edge portion holes into engagement with corresponding other of said nuts for fastening a part to said wall in sealed relation to said opening by sealingly engaging the outer side of said gasket, there being clearance between the ends of said nuts and the corresponding screw heads and between the ends of said other nuts and the part, when said screws and cap screws are tightened, to enable compression of said marginal edge portions and said gasket.

References Cited in the file of this patent

UNITED STATES PATENTS

| Number | Name | Date |
|---|---|---|
| 1,198,166 | Stoddard | Sept. 12, 1916 |
| 2,343,235 | Bashark | Feb. 29, 1944 |
| 2,366,442 | Cunningham | Jan. 2, 1945 |
| 2,441,009 | Cunningham | May 4, 1948 |
| 2,457,066 | Pepersack | Dec. 21, 1948 |
| 2,523,585 | Mueller et al. | Sept. 26, 1950 |